May 15, 1956    R. L. GOLD ET AL    2,745,217
MACHINE FOR IMPROVING THE KEEPING QUALITIES OF PLANTS
AND RESTORING WILTED PLANTS TO FULL FRESHNESS
Filed May 5, 1953    3 Sheets-Sheet 1

INVENTORS
Richard Lucius Gold
Paul Zaveschel
BY [signature]

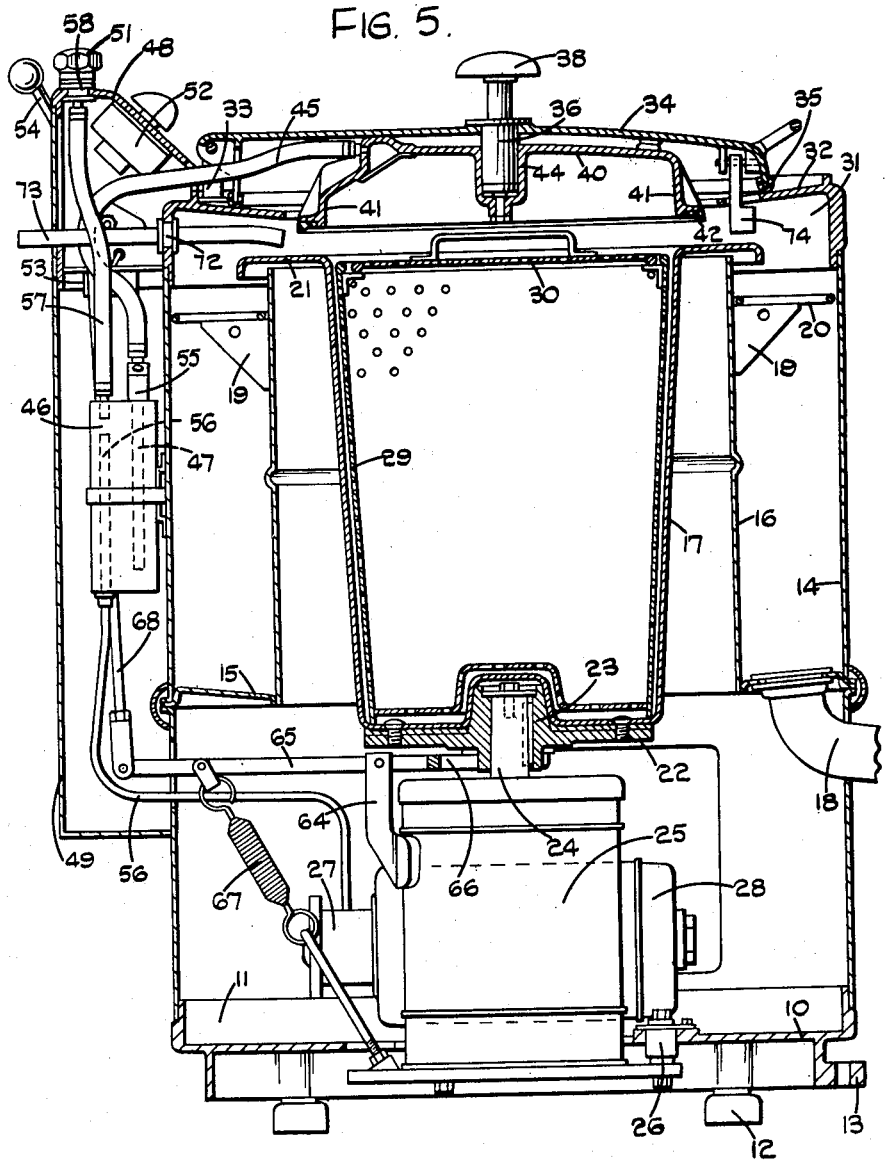

May 15, 1956  R. L. GOLD ET AL  2,745,217
MACHINE FOR IMPROVING THE KEEPING QUALITIES OF PLANTS
AND RESTORING WILTED PLANTS TO FULL FRESHNESS
Filed May 5, 1953  3 Sheets-Sheet 3
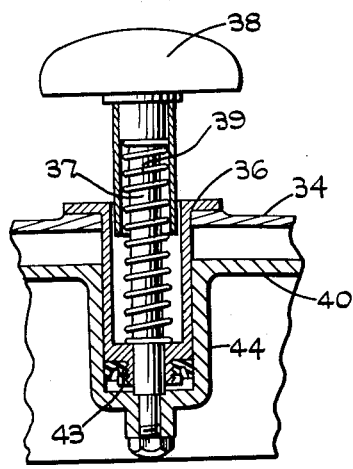
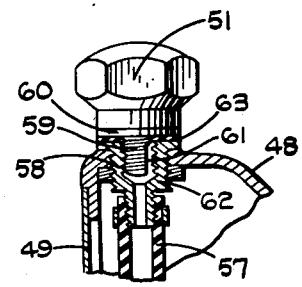
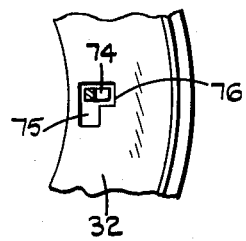
INVENTORS
Richard Lucius Gold
Paul Traeschel
BY United States Patent Office 2,745,217
Patented May 15, 1956

2,745,217

MACHINE FOR IMPROVING THE KEEPING QUALITIES OF PLANTS AND RESTORING WILTED PLANTS TO FULL FRESHNESS

Richard Lucius Gold, Erdington, Birmingham, England, and Paul Froeschel, Ghent, Belgium Application May 5, 1953, Serial No. 353,102

8 Claims. (Cl. 47—1)

This invention relates to the treatment of plants according to the process described in our co-pending application Serial No. 251,852 filed October 18, 1951 (now abandoned) of which the present application is a continuation-in-part. In this context the word "plants" is used generically to cover vegetables, fruit and flowers and the aforesaid process provides for the improvement of the keeping qualities of plants and for restoring wilted plants to full freshness.

Such process broadly comprises the infiltration of liquid into the intercellular spaces of plants and, in certain cases, the removal of some or most of the infiltrated liquid, resulting in the restoration of wilted plants and generally improving the keeping qualities of plants.

The main object of the present invention is to provide a machine for carrying out such process.

Subsidiary objects of the present invention are the provision of improvements in the construction and operation of such machine. Further objects and aims of the present invention appear from the following description of one embodiment of the invention which is described with reference to the drawings.

The invention is illustrated in the accompanying drawings wherein:

Figure 5 is a vertical section through the machine.

Figure 6 is a detail view of the control for the lid of the drum.

Figure 7 is a detail view of the vacuum release valve.

Figure 8 is a detail view of the safety lock on the cover of the machine.

Figure 1:
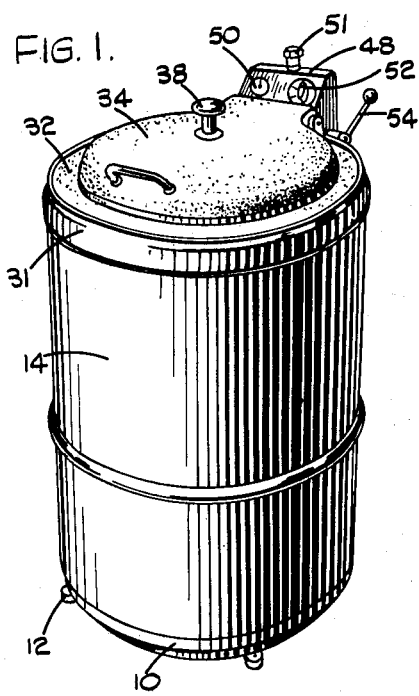
Figure 1 is a perspective view of a complete machine.

Referring to the drawings the machine comprises a base 10 of circular form having an upwardly extending flange 11 and being mounted upon suitable rubber or like resilient mountings 12 which are secured to lugs 13. Secured to the upwardly extending flange 11 is an outer cylindrical casing 14 which is made in two sections the upper section being welded or otherwise secured to the lower section and there also being secured between these two sections an annular ring 15 which extends between the outer casing 14 and an inner cylindrical casing 16. This inner cylindrical casing is mounted around the drum 17 which is to contain the plants and the annular ring 15, which extends from the bottom of the inner casing to the inside of the outer casing, forms with the two casings an annular space into which water thrown from the drum 17 is discharged and collects, and at a suitable point there is connected to an aperture in this annular ring the upper end of a pipe 18 through which the discharge water can pass to waste.

At a position near its upper end the inner casing 16 has secured thereto a number of projecting lugs 19 for example three, which support a perforated annular ring 20 and this is provided for the purpose of preventing any solid matter such as dirt or pieces of the plants themselves from being discharged into the space between the inner and outer casings and thus finding its way into the waste pipe 18 which might cause blockage.

Mounted within the inner casing 16 is the drum 17 which is of generally cylindrical formation although tapering somewhat from the top to the bottom and at its upper edge it has a radially extending flange 21 which extends beyond the periphery of the inner casing and is curved downwardly at the edge.

The bottom of the drum 17 is secured to a circular flange 22 provided on a sleeve 23 which is fixed to the upper end of the shaft 24 of an electric motor 25 which is mounted on the base 10 of the machine with its driving shaft 24 in a vertical plane. The lower end of the motor 25 is mounted upon suitable resilient supports 26 such as rubber mountings to reduce the amount of vibration when the drum is revolving. Also mounted on the base 10 to one side of the motor is a vacuum pump or air compressor 27 and electric motor 28 for driving same.

The plants to be treated are carried in a receptacle 29 which is of substantially the same dimensions as the drum so as to fit easily therewithin and this receptacle has a perforated bottom and sides and is provided with short legs so that its lower end is raised away from the base of the drum. A perforated lid 30 is provided for this receptacle and the lid has a handle or handles by means of which it may be grasped. Suitable catch means are provided for locking this lid 30 in position on top of the receptacle 29.

Secured to the upper edge of the outer casing is a ring 31 having a vertical portion and an inwardly extending flange 32 which is inclined downwardly towards the axis of the machine somewhat and at one side this flange has formed thereon two hinge members 33 to which is hinged a lid 34 which is of circular shape in the form of a disc the periphery of which is provided with a rubber sealing ring 35 which is adapted to rest on the inwardly extending flange 32.

At centre of this disc shaped lid there is fixed a hollow sleeve 36 through which extends a spindle 37 provided at its upper end with an operating knob 38 and around the spindle is provided a spring 39 engaging the underside of the knob at one end and a flange on the sleeve 36 at the other end so that the knob and spindle are urged upwardly.

Fixed to the lower end of the spindle 37 beneath the disc shaped lid 34 is a lid 40 for the drum and this lid is of dished shaped with a peripheral rim 41 extending downwardly and outwardly and having a radial flange at its lower end. Secured to the radially extending flange aforesaid is a rubber sealing ring 42 which has a downwardly curved peripheral lip and this is adapted to seat upon the radially extending flange 21 at the upper end of the drum 17 so as to form an air-tight seal therewith. The strength of the spring 39 is such that it is sufficient to maintain the lid 40 in the raised position and the lid 40 can be lowered by pressing downwardly on the knob 38.

In order to prevent lid 40 from rising too rapidly under spring pressure and banging against lid 34 the sleeve 36 has a cup shaped washer 43 secured to its lower end and the sleeve 36 is slidable within a cylindrical recess 44 in the lid 40. When the knob 38 is pressed down air can pass the washer 43 through the substantial clearance between sleeve 36 and recess 44 but on the spring urged return air which is trapped in the recess 44 can only escape between spindle 37 and sleeve 36 where the clearance is made smaller so that a damping effect is obtained.

The flange 41 is made deep enough to provide a substantial space within the lid 40 so that any rise in the water level during operation can be accommodated without water being drawn into the suction pipe of the vacuum pump.

The lid 40 of the drum has connected to its upper face near the edge thereof one end of a flexible pipe 45 the joint between the pipe and the lid being made air-tight.

The other end of the pipe 45 enters the top of the tank 46 of a water trap and is connected to a pipe 47 which extends to near the bottom of the tank.

Formed integrally with the inwardly flanged ring 31 at the top of the outer casing is a housing 48 which projects outwardly and upwardly from the side of this ring and to this housing are connected suitable cover plates 49 which provide a compartment between the cover plates and the outer casing within which is housed the water trap. The said housing 48 also carries a vacuum gauge, the operating knob 51 of an air release valve, a multiposition electric switch 52, a safety switch 53 and a brake lever 54.

The flexible pipe 45 has its end connected to a Y-shaped connection piece 55 the lower main pipe 47 of which extends downwardly into the tank 46. The other leg of the Y-piece has a pipe (not shown) extending upwardly therefrom and connected at its upper end to the vacuum gauge 50.

At the bottom of the water trap tank there is connected one end of a pipe 56 the other end of which is connected to the vacuum pump 27 and this pipe extends upwardly within the water trap to a position almost at the closed top thereof. The top of the water trap is connected by a pipe 57 to an air release valve 58 mounted in the aforesaid housing on the side of the machine and this air release valve comprises the following parts as shown in Figure 7. The operating knob 51 is fixed on the upper end of a spindle 59 which has a radially extending flange 60 below the operating knob and also an axially extending screw threaded part which has a flat 61 milled on one side thereof. This screw threaded part has screwed engagement with an internal screwed sleeve 62 mounted in the upper face of the housing 48 and a rubber sealing washer 63 is disposed between the flanged upper end of this sleeve and the flange 60 which is below the operating knob so that when the operating knob 51 is turned in the appropriate direction its flange is raised thus releasing the pressure from the sealing washer 63 and allowing air to enter past the flattened portion 61 on the screw threaded part within the said sleeve.

At one side the electric motor 25 for driving the drum 17 is provided with an upwardly extending arm 64 to the upper end of which is pivoted about a horizontal axis a brake lever 65 and this lever extends below the flanged sleeve supporting the drum and is bifurcated to embrace the sleeve and one each arm 66 of the bifurcated part there is provided a brake shoe.

The other end of the lever 65 extends through a slot in the outer casing and near the inner side of the outer casing it has fixed thereto one end of a spring 67 the other end of which is connected to the base of the motor 25 so that the brake shoes are spring urged into the engaged position.

Figure 3:
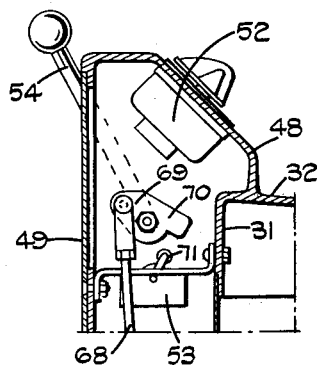
Figure 3 is a detail view of the safety switch operation.

The outer end of this brake lever 65 has connected thereto the lower end of a brake operating rod, 68, the upper end of which is connected to a crank arm 69 (see Figure 3) fixedly mounted upon a spindle which is journalled in one side wall of the aforesaid housing 48 on the side of the machine. Outside the housing this spindle has fixed thereto the operating lever 54 so that when the spindle is turned the crank arm is rotated to move the brake operating rod and thus actuating the pivotally mounted brake lever.

The crank arm 69 is also provided with a projecting lug 70 which is adapted for engagement with a roller 71 mounted on the dolly of an electric switch 53 which is electrically connected in the circuit to the motor for driving the drum and the arrangement is such that the circuit to this motor is only completed when the operating lever 54 has been turned so as to release the brakes and thus turn the crank arm so that its projecting lug actuates the switch and closes the circuit.

The arrangement is also such that the operating lever is pushed backwardly until the crank passes a dead centre position so that it is locked in this position.

Mounted on the front face of housing 48 is the rotary switch 52 for operating the drum motor and pump motor electric circuits.

Figure 4:
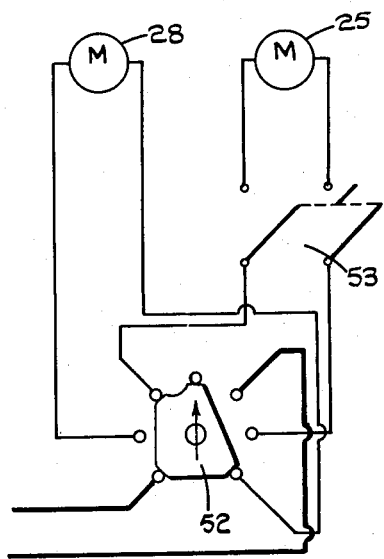
Figure 4 is a wiring diagram.

Referring to Figure 4, the switch 52 has four positions and is arranged so that in two diametrically opposite positions the switch is "off" and in two diametrically opposite positions at right angles to the others the switch is "on," one for the pump motor and one for the drum motor.

The flanged ring at the top of the inner casing is also provided with a connection 72 through which passes a pipe 73 the inner end of which is directed inwardly and downwardly so that water ejected therefrom will be directed into the drum below the lid in its raised position. This pipe is connected to a suitable supply of water under pressure and may be provided with a control valve adjacent the machine.

In operation a receptacle 29 loaded with plants is placed within the drum 17 and the disc like lid 34 of the machine is lowered until its rubber ring 35 engages the flanged ring at the top of the outer casing. The knob 38 in the centre of this lid is then pushed downwardly thus carrying the lid 40 of the drum down until its sealing ring 42 engages the flange 21 at the top of the drum. Prior to lowering the lid of the drum the water supply is turned on so as to completely fill the drum with water, excess water flowing out over the top of the drum and down to be discharged through the waste pipe, whereupon the water supply is shut off.

With the lid of the drum held in position the operating switch 52 is turned to switch the pump motor on and a vacuum is created within the drum so that the lid of the drum is then held tight on its seating and pressure can be released from the knob. After a predetermined degree of vacuum has been reached the knob of the air release valve 58 is rotated so as to allow air to enter and break the vacuum within the drum.

Figure 2:
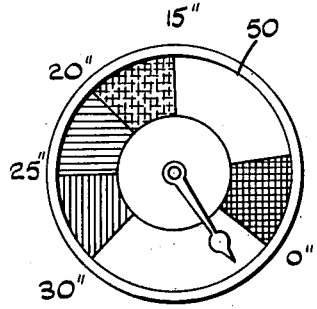
Figure 2 is an enlarged view of the dial of the vacuum gauge.

The correct required degree of vacuum is red on the vacuum gauge dial shown in Figure 2 wherein certain areas are coloured. Part of the area between 0 and 15" is coloured black, from 15" to 20" being yellow, from 20" to 25" being blue and from 25" to 30" being red. Examples of degrees of vacuum required for various plants are given below, with reference to dial colours:

Yellow: Lettuce, cress, spinach, endive.
Blue: Celery, radish, leek, parsley, mint, asparagus, chicory.
Red: Sprouts, beans, peas, carrots, cauliflower, beetroot, artichokes, turnips.

The black area indicates degree of vacuum for repetition of the process.

The vacuum created inside the drum causes the air to be evacuated from the intercellular spaces of the plants and such air is withdrawn by the pump. When the vacuum is reduced by operating the air release valve water is forced into the intercellular spaces of the plants. This process may be repeated several times whilst the vacuum pump may be kept running.

After completion of the process of infiltration the air release valve is again opened and the operating switch turned to stop the vacuum pump. On release of the vacuum the spring pressure raises the lid from the drum and the operating switch is turned to the position for starting the drum motor. The drum motor cannot be started however, until the operating lever on the side of the housing has been pulled forwardly to cause the crank arm to pass over its dead centre position and operate the safety switch to complete the motor circuit, this movement also causing the brakes to be released from the drum so that the drum is rotated at high speed.

A safety device is provided to prevent the lid 34 of the machine from being opened when the drum is revolving and this comprises a locking flap 74 pivotally mounted on the lid, which flap passes through an L-shaped slot in the flanged ring at the top of the outer casing (see Figure 8).

When the drum is rotating the air current acts on the flap 74 causing it to turn so as to be disposed out of line with the part 76 of the slot and thus acting as a lock to prevent the lid from being raised.

During rotation the water in the drum is discharged over the top of the drum and the process may continue unilt the plants are surface dried.

Should it be desirable to remove some or most of the water which has been infiltrated into the plants this can be achieved by exposing the plants to suitable atmospheric conditions to accelerate the evaporation of water contained in the intercellular spaces, or alternatively the plants may be subjected to additional treatment in the machine to the same end. For this latter purpose, when all water has been emptied from the drum the plants may be subjected to centrifuging for a suitable period of time or alternatively, after removing all water from the drum, the lid may be closed and the vacuum pump restarted to create a high vacuum within the drum thus removing some or most of the unwanted liquid from the intercellular spaces. This process may be repeated until the desired results have been obtained.

The purpose of the water trap described hereinbefore is to prevent water entering the vacuum pump. Any water drawn into the vacuum pipe 45 which is fixed in the lid will enter the tank 46 of the water trap and as the pipe connection to the vacuum pump has its upper end located near the top of the container there is no chance of the water in the container reaching the top of this pipe under normal conditions. The container becomes emptied of any such water that may have been trapped in it each time the vacuum is broken during operation, by opening the air release valve.

If the plants to be treated are dirty they can be washed in the machine by filling the drum containing the plants with water. The outer lid is then closed and the drum rotated, with water still being injected, the lid of the drum being left in the upper position for this purpose. This provides a washing and cleaning process and dirt which sticks to the plants may be removed by stopping the drum and restarting it after a suitable interval thus causing a surge effect in the water which assists in removing dirt.

Alternatively the motor may be provided with special windings to allow it to run at reduced speed for washing plants.

Attachments may be provided for the washing operation such as an extension pipe for fitting to the water inlet pipe 73 and terminating in a spray at the axis of the drum, the whole being supported by an arm which hooks over the flange 32 of ring 34, or a plate resting on the flange.

The lid 30 of the receptacle may have a hole to allow the spray to enter whilst the drum is rotated, such that a jet is directed towards the bottom of the receptacle and is then deflected outwards to flow along the sides of the rotating drum to remove all dirt.

What we claim then is:

1. Apparatus for the treatment of plants, wherein water is caused to enter into the intercellular spaces of the plants, comprising a drum adapted to contain the plants submerged in water and mounted for rotation about a vertical axis for drying the plants; a closure lid for the open end of said drum having air-tight engagement with the drum; a vacuum pump operatively connected to the drum for creating a vacuum therein when the lid is in position; and a water trap including a closed tank having a pipe from the suction side of the pump entering its lower part and extending to near the top of the tank, a pipe connected to the lid of the drum entering the upper part of the tank and extending to near the bottom thereof, and a pipe connected to the upper part of the tank leading to an air release valve adapted to be operated to release vacuum created within the drum when the lid is in position on the drum.

2. Apparatus according to claim 1 wherein an outer casing surrounding the drum is provided with a flanged ring at the top thereof, said flanged ring having formed integrally therewith a housing which projects to one side of the casing and said housing having mounted therein, the air release valve, a multiposition electric switch for controlling operation of separate electric motors for driving the drum and the vacuum pump, a brake-operating arm for actuating a brake on the drum, and a safety switch electrically connected in the circuit to the drum motor and adapted to be operated by the operating arm to close the circuit when the arm is moved to release the brake.

3. Apparatus according to claim 1 wherein an outer casing surrounding the drum has a closure member hingedly mounted on the upper edge thereof and an inwardly projecting flange upon which the closure member seats, said flange having an L shaped slot cut therein and said closure member having pivotally mounted on the underside thereof a locking flap which passes through said slot when the closure member seats on the flange, said flap having an enlarged portion which engages behind the flange when the flap is displaced by air currents produced by rotation of the drum so as to prevent the closure member being opened when the drum is rotating.

4. Apparatus according to claim 1 wherein an outer casing surrounding the drum is provided with a closure member hingedly mounted on the upper edge thereof, said closure member having mounted centrally therein a cylindrical sleeve, the axis of which is vertical when the closure member is closed, a rod mounted for axial sliding movement in said sleeve, spring means tending to urge said rod outwardly of the sleeve, the closure lid for the drum being fixed to the lower end of said rod and having a centrally disposed hollow cylindrical boss which is telescopically slidable upon the outer surface of said sleeve, the lower end of said sleeve being fitted with a cup-shaped washer of deformable material engaging the inner wall of said hollow boss.

5. Apparatus for the treatment of plants by the infiltration of liquid into the intercellular spaces thereof comprising, in combination, a housing; a drum rotatably mounted within said housing, said drum being adapted to receive the plants to be treated; vacuum creating means mounted in said housing for evacuating said drum after said plants have been placed therein; vacuum releasing means mounted on said housing for admitting air into said evacuated drum after the plants have been subjected to a predetermined vacuum for a desired time; means for admitting liquid into said drum interior for infiltration into the intercellular spaces of said plants; discharge means for removing any liquid in excess of the amount desired; means for rotating said drum to help remove said excess liquid; and a liquid trap mounted between said drum interior and said vacuum creating means to prevent any liquid from reaching said vacuum creating means.

6. Apparatus for the treatment of plants by the infiltration of liquid into the intercellular spaces thereof comprising, in combination, a housing; a drum rotatably mounted within said housing, said drum being adapted to receive the plants to be treated; vacuum creating means mounted in said housing for evacuating said drum after said plants have been placed therein; vacuum releasing means mounted on said housing for admitting air into said evacuated drum after the plants have been subjected to a predetermined vacuum for a desired time; means for admitting liquid into said drum interior for infiltration into the intercellular spaces of said plants; discharge means for removing any liquid in excess of the amount desired; means mounted in said housing for rotating said drum about its vertical axis to help remove said excess liquid; and a liquid trap mounted between said drum interior and said vacuum creating means to prevent any liquid from reaching said vacuum creating means.

7. Apparatus for the treatment of plants by the infiltration of liquid into the intercellular spaces thereof comprising, in combination, a housing; a drum rotatably mounted within said housing, said drum being adapted to receive the plants to be treated; an air compressor mounted in said housing; a conduit connecting said air compressor to the interior of said drum for evacuating said drum after said plants have been placed therein; an air release valve mounted on said housing for admitting air into said evacuated drum after the plants have been subjected to a predetermined vacuum for a desired time; means for admitting liquid into said drum interior for infiltration into the intercellular spaces of said plants; discharge means for removing any liquid in excess of the amount desired; means for rotating said drum to help remove said excess liquid; and a liquid trap mounted in series with said conduit to prevent any liquid from reaching said vacuum creating means.

8. Apparatus for the treatment of plants by the infiltration of liquid into the intercellular spaces thereof comprising, in combination, a housing; a drum rotatably mounted within said housing, said drum being adapted to receive the plants to be treated; vacuum creating means mounted in said housing for evacuating said drum after said plants have been placed therein; vacuum releasing means mounted on said housing for admitting air into said evacuated drum after the plants have been subjected to a predetermined vacuum for a desired time; means for admitting liquid into said drum interior for infiltration into the intercellular spaces of said plants; discharge means for removing any liquid in excess of the amount desired; means for rotating said drum to help remove said excess liquid; a liquid trap mounted between said drum interior and said vacuum creating means to prevent any liquid from reaching said vacuum creating means; and a brake means for preventing rotation of said drum until desired.

References Cited in the file of this patent

UNITED STATES PATENTS

| | | |
|---|---|---|
| 547,227 | Pfitzer | Oct. 1, 1895 |
| 607,038 | Harster | July 12, 1898 |
| 1,071,956 | Psarski | Sept. 2, 1913 |
| 1,844,008 | Grauss | Feb. 9, 1932 |
| 1,925,462 | Rosenbaum | Sept. 5, 1933 |
| 2,344,151 | Kasser | Mar. 14, 1944 |
| 2,568,792 | Cripps | Sept. 25, 1951 |